(12) United States Patent
Yang

(10) Patent No.: US 12,571,996 B2
(45) Date of Patent: Mar. 10, 2026

(54) IMAGING DEVICE AND ELECTRONIC EQUIPMENT HAVING THE SAME

(71) Applicant: Rayprus Technology (Foshan) Co., Ltd., Foshan (CN)

(72) Inventor: Li-Ying Yang, New Taipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 247 days.

(21) Appl. No.: 18/231,296

(22) Filed: Aug. 8, 2023

(65) Prior Publication Data

US 2024/0353655 A1      Oct. 24, 2024

(30) Foreign Application Priority Data

Apr. 24, 2023    (CN) .......................... 202310457549.2

(51) Int. Cl.
*G06T 7/50*          (2017.01)
*G02B 13/00*        (2006.01)

(52) U.S. Cl.
CPC ............ *G02B 13/0055* (2013.01); *G06T 7/50* (2017.01)

(58) Field of Classification Search
CPC ......... G02B 7/021; H04N 23/54; H04N 23/55
See application file for complete search history.

(56) References Cited

U.S. PATENT DOCUMENTS

| | | | |
|---|---|---|---|
| 10,393,929 B1 * | 8/2019 | Bikumandla | ........ G02B 5/1823 |
| 10,406,630 B1 * | 9/2019 | Karlsen | ................ G02B 26/105 |
| 2010/0270469 A1 * | 10/2010 | Johnson | ................ H04N 23/55 |
| | | | 359/825 |

FOREIGN PATENT DOCUMENTS

| | | |
|---|---|---|
| CN | 100409059 C | 8/2008 |
| CN | 111025317 A | 4/2020 |
| CN | 113977072 A | 1/2022 |
| TW | 202121042 A | 6/2021 |

* cited by examiner

*Primary Examiner* — Jennifer D. Carruth
(74) *Attorney, Agent, or Firm* — ScienBiziP, P.C.

(57) ABSTRACT

An imaging device includes an imaging mechanism, a lens assembly having an optical axis and including a transparent lens, and a first moiré lens assembly including a first diffractive lens and a second diffractive lens. The imaging mechanism includes a light emitting element, a light receiving element, and a calculation element. A through hole is defined by the transparent lens. Along the optical axis, a projection of the light receiving element is located within a projection range of the through hole, a projection of the light emitting element is located within a projection range of the transparent lens. The first diffractive lens is fixed in the through hole. The second diffractive lens is fixed between the first diffractive lens and the light receiving element. The transparent lens is configured to drive the first diffractive lens to rotate to adjust a focal length of the first moiré lens assembly.

16 Claims, 7 Drawing Sheets

100

100

IMAGING DEVICE AND ELECTRONIC EQUIPMENT HAVING THE SAME

FIELD

The subject matter herein generally relates to fields of imaging technology, and in particular, to an imaging device and an electronic device having the imaging device.

BACKGROUND

It is often necessary to interpret changes in micromuscles through imaging devices, such as conversations in noisy environments, conversations with hearing-impaired people, conversations with foreigners, unlocking mobile phones using biometric features, or a polygraph system that detects micro expressions of facial muscles. In order to further enhance the quality and the resolution of an image, it is necessary to obtain distance information before capturing the image, so as to increase the speed of autofocus adjustment, assist image shooting, and perform 3D image representation of 2D images.

Existing imaging devices usually use a motor to drive the lens to move along the optical axis to adjust the focus, which may increase the volume occupied by the imaging device in the direction of the optical axis, which is not conducive to the miniaturization of the imaging device.

BRIEF DESCRIPTION OF THE DRAWINGS

Implementations of the present disclosure will now be described, by way of embodiments, with reference to the attached figures.

DETAILED DESCRIPTION

Figure 1:
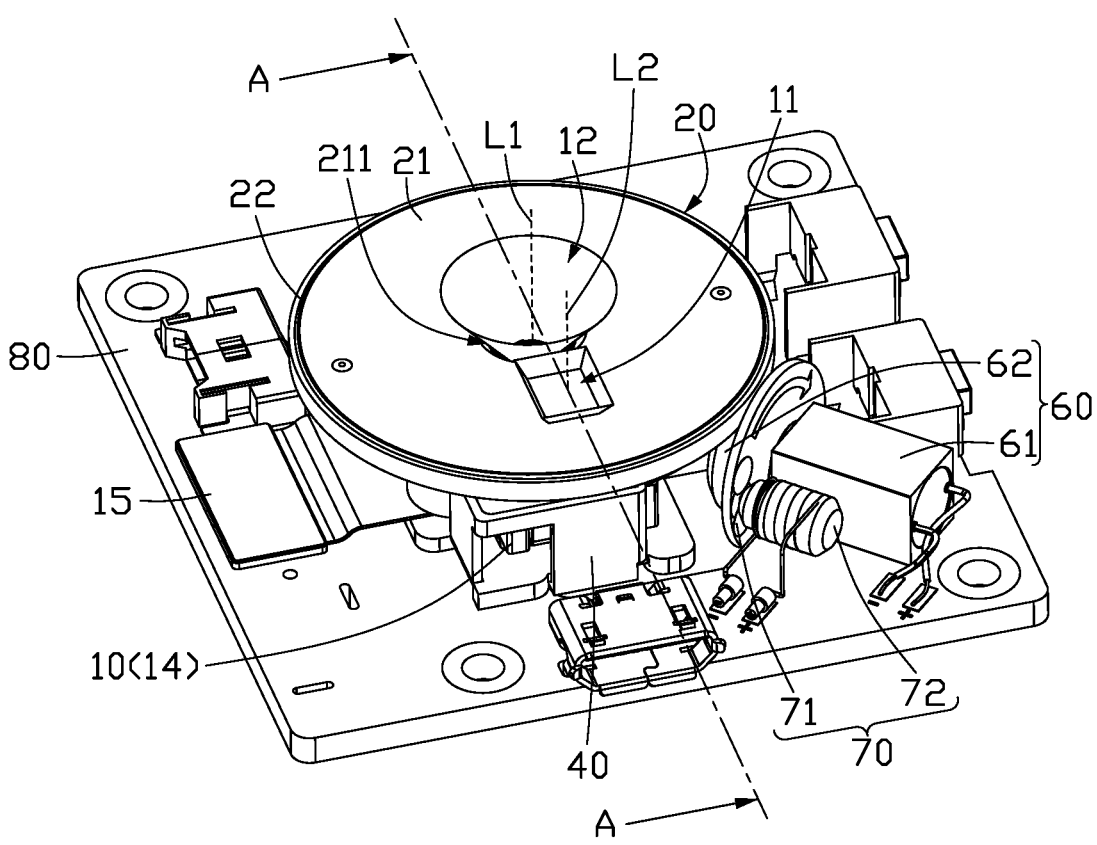
FIG. 1 is a diagram of a first viewing angle of an embodiment of an imaging device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
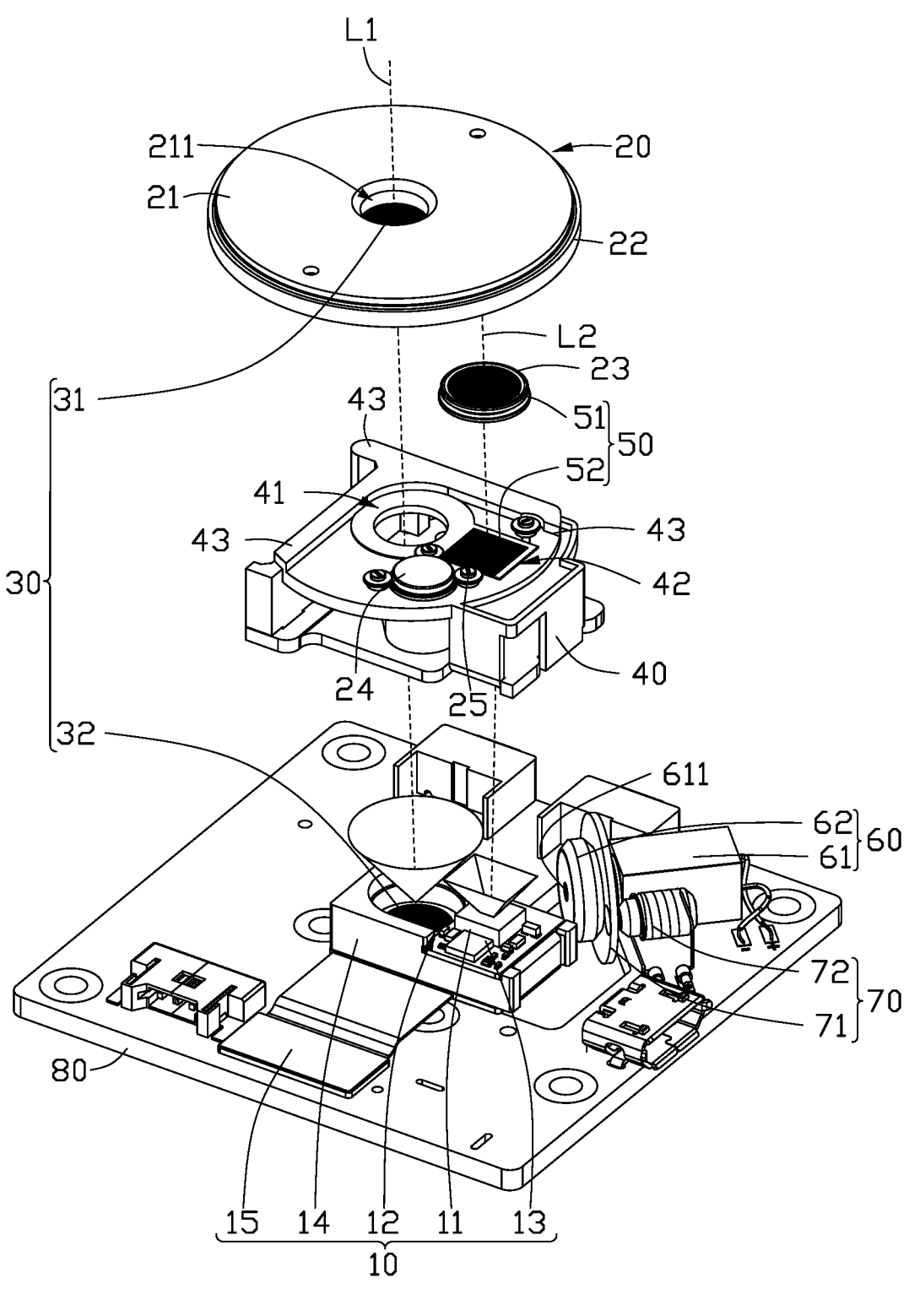
FIG. 2 is an exploded, diagrammatic view of an embodiment of an imaging device according to the present disclosure.

FIG. 1 illustrates an embodiment of an imaging device 100. Referring to FIG. 1 and FIG. 2, the imaging device 100 includes an imaging mechanism 10, a lens assembly 20, and a first moiré lens assembly 30.

The imaging mechanism 10 includes a light emitting element 11, a light receiving element 12, and a calculation element 13. The light emitting element 11 and the light receiving element 12 are arranged at intervals. The light emitting element 11 may be LED or laser, and the light emitting element 11 is configured to irradiate a target area with irradiating light. The light receiving element 12 may be a dot-matrix photosensitive sensor such as a CMOS sensor, and the light receiving element 12 is configured to receive natural light and reflected light of the irradiating light reflected by a target object in the target area. The calculation element 13 is electrically connected to the light emitting element 11 and the light receiving element 12 and configured to generate image information and distance information of the target object. Specifically, the calculation element 13 may be a controller with calculation function and calculate the distance information of the target object by calculating the time difference between the time when the light emitting element 11 emits the irradiating light and the time when the light receiving element 12 receives the reflected light. Optionally, the imaging mechanism 10 may be a Time of Flight (TOF) camera.

The lens assembly 20 has an optical axis L1 extending through the light receiving element 12. The lens assembly 20 includes a transparent lens 21 rotatable around the optical axis L1. A through hole 211 is defined by the transparent lens 21, and a central axis of the through hole 211 coincides with the optical axis L1. Specifically, the transparent lens 21 may be in a shape of a ring. Along the optical axis L1, a projection of the light receiving element 12 is located within a projection range of the through hole 211, so that the light receiving element 12 receives the natural light and the reflected light of the irradiating light through the through hole 211. Along the optical axis L1, a projection of the light emitting element 11 is located within a projection range of the transparent lens 21, and the transparent lens 21 will not affect the light emitted by the light emitting element 11. The irradiating light from the light emitting element 11 passes through the transparent lens 21 to illuminate the target area, so as to reduce a risk of interference to the irradiating light from the light emitting element 11 when the transparent lens 21 rotates.

The first moiré lens assembly 30 includes a first diffractive lens 31 and a second diffractive lens 32 arranged in sequence along a direction of the optical axis L1. Both the first diffractive lens 31 and the second diffractive lens 32 are Diffractive Optical Elements (DOE). A focal length of the first moiré lens assembly 30 is precisely adjusted by adjusting an angle between the first diffractive lens 31 and the second diffractive lens 32 by rotating the first diffractive lens 31 and the second diffractive lens 32. The first diffractive lens 31 is located in the through hole 211 and fixed on the transparent lens 21, and the second diffractive lens 32 is fixedly connected between the first diffractive lens 31 and the light receiving element 12, so that the light receiving element 12 receives the natural light and the reflected light of the irradiating light through the first moiré lens assembly 30. In at least one embodiment, the imaging mechanism 10 may include a housing 14 for fixing the light emitting element 11, the light receiving element 12, and the calculation element 13, and the second diffractive lens 32 may be fixed in the housing 14 so that the second diffractive lens 32 can be located between the first diffractive lens 31 and the light receiving element 12 under the support of the housing 14. The transparent lens 21 is used to drive the first diffractive lens 31 to rotate relative to the second diffractive lens 32 to adjust the focal length of the first moiré lens assembly 30.

In the above imaging device 100, the irradiating light from the light emitting element 11 passes through the transparent lens 21 to illuminate the target area, the light receiving element 12 receives the natural light and the reflected light of the irradiating light through the through hole 211, and the focal length of the first moiré lens assembly 30 can be adjusted by rotating the transparent lens 21 to drive the first diffractive lens 31 to rotate relative to the second diffractive lens 32. Compared with the existing way of driving the lens to move along the direction of the optical axis to adjust the focal length, a volume occupied by the imaging device 100 in the direction of the optical axis L1 can be reduced, which is beneficial to the miniaturization of the imaging device 100.

Figure 3:
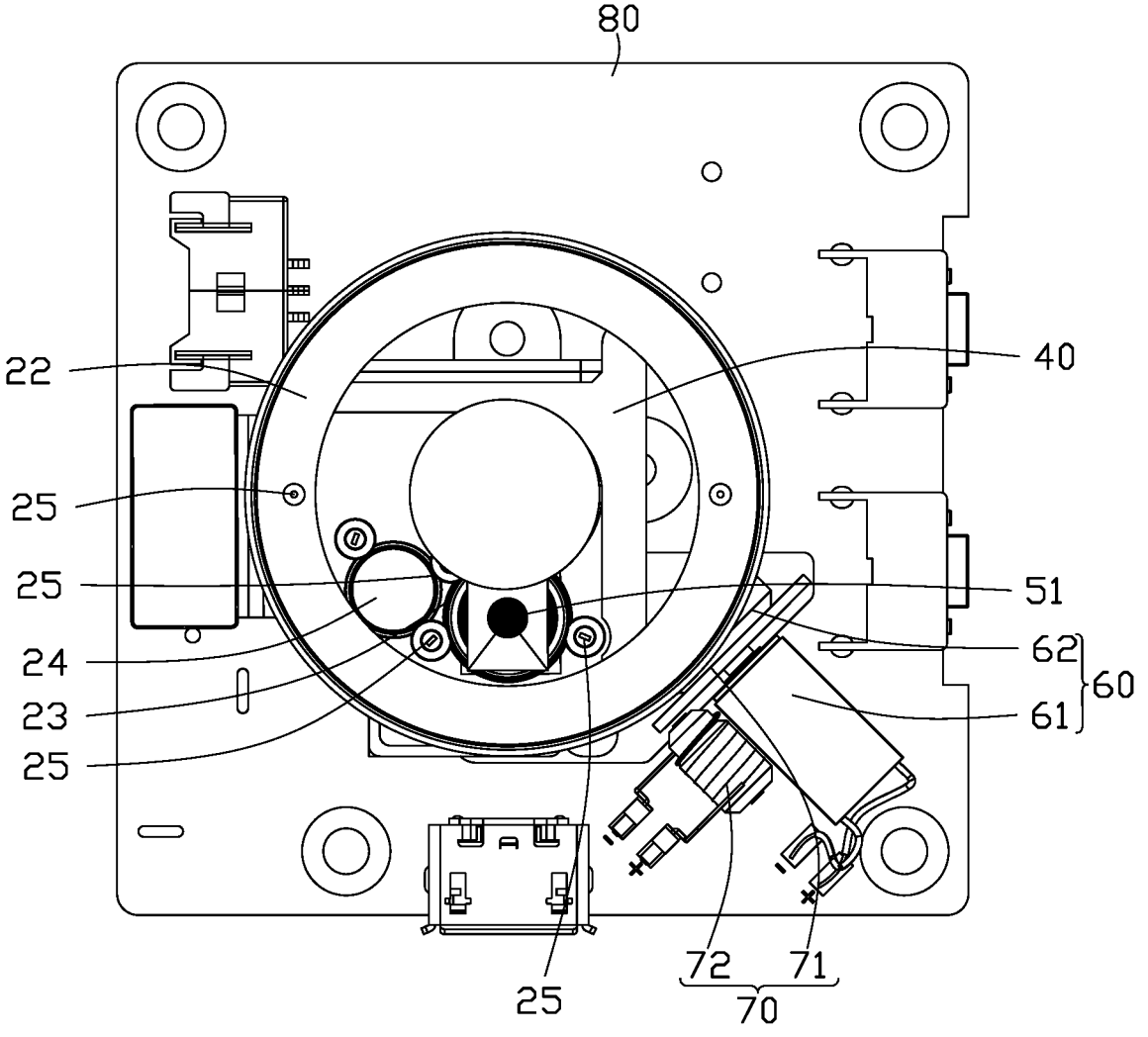
FIG. 3 is a top view of a partial structure of an imaging device according to the present disclosure.

In at least one embodiment, referring to FIG. 1, FIG. 2, and FIG. 3, the imaging device 100 may further include a housing 40, and the housing 40 defines a first light through hole 41 and a second light through hole 42 arranged at intervals. The imaging mechanism 10 is received in the housing 40 to be protected, the light receiving element 12 is exposed from the first light through hole 41, and the light emitting element 11 is exposed from the second light through hole 42. The lens assembly 20 may further include a first rim 22, and the first rim 22 is annular. The first rim 22 is rotatably sleeved on the housing 40 around the optical axis L1, and the transparent lens 21 is fixed in the first rim 22. The first rim 22 serves as a stress point for rotating relative to the housing 40 under an action of an external force, and then drives the transparent lens 21 to rotate synchronously, so as to improve the stability of the position between the transparent lens 21 and the imaging mechanism 10.

In at least one embodiment, the lens assembly 20 may further include a second rim 23, and the second rim 23 is annular. The second rim 23 is located in the first rim 22, and a central axis of the second rim 23 coincides with an optical axis L2 of the light emitting element 11. The second rim 23 is rotatably connected to the housing 40 around the optical axis L2 of the light emitting element 11. The optical axis L2 and the optical axis L1 are arranged in parallel.

The imaging device 100 may further include a second moiré lens assembly 50. The second moiré lens assembly 50 includes a third diffractive lens 51 and a fourth diffractive lens 52 sequentially arranged in the direction of the optical axis L2. Both the third diffractive lens 51 and the fourth diffractive lens 52 are Diffractive Optical Elements (DOE). A focal length of the second moiré lens assembly 50 is precisely adjusted by adjusting an angle between the third diffractive lens 51 and the fourth diffractive lens 52 by rotating the third diffractive lens 51 and the fourth diffractive lens 52. The third diffractive lens 51 is fixed in the second rim 23, the fourth diffractive lens 52 is located in the second light through hole 42 and fixed in the housing 40, so that the irradiating light emitted by the light emitting element 11 passes through the second moiré lens assembly 50. The second rim 23 is drivingly connected to the first rim 22, the second rim is used to rotate synchronously with the first rim 22 to drive the third diffractive lens 51 to rotate relative to the fourth diffractive lens 52, thereby synchronously adjusting the focal length of the second moiré lens assembly 50.

It should be noted that, since there is a linear relationship between the focal length of the first moiré lens assembly 30 and the focal length of the second moiré lens assembly 50, a cooperation of the first rim 22 and the second rim 23 may facilitate synchronous adjustment of the focal length of the first moiré lens assembly 30 and the focal length of the second moiré lens assembly 50, thereby improving the imaging efficiency.

In at least one embodiment, the lens assembly 20 may further include a first driven wheel 24 and a plurality of second driven wheels 25 rotatably connected to the housing 40. The first driven wheel 24 and the plurality of second driven wheels 25 are located in the first rim 22. The first driven wheel 24 abuts against the first rim 22, and the first rim 22 rotates to drive the first driven wheel 24 to rotate synchronously. The plurality of second driven wheels 25 abut against a periphery of the first driven wheel 24 and a periphery of the second rim 23 respectively to balance a torque stress of the rotation of the first driven wheel 24 and a torque stress of the rotation of the second rim 23, so as to improve the rotation stability of the first driven wheel 24 and the second rim 23. At least one of the plurality of second driven wheels 25 abuts against the periphery of the first driven wheel 24 and the periphery of the second rim 23 at the same time, the first driven wheel 24 rotates to drive the at least one of the plurality of second driven wheels 25 between the first driven wheel 24 and the second rim 23 to rotate synchronously, so as to drive the second wheel rim 23 to rotate synchronously.

During use, the first rim 22 serves as the stress point for rotating relative to the housing 40 under the action of the external force, and then drives the transparent lens 21 to rotate synchronously, so that the first diffractive lens 31 is driven to rotate relative to the second diffractive lens 32 to adjust the focal length of the first moiré lens assembly 30. Moreover, the first rim 22 also drives the first driven wheel 24 to rotate synchronously, and the at least one of the plurality of second driven wheels 25 between the first driven wheel 24 and the second rim 23 drives the second rim 23 to rotate synchronously, so that third diffractive lens 51 is driven to rotate relative to the fourth diffractive lens 52 to adjust the focal length of the second moiré lens assembly 50.

In at least one embodiment, the number of the plurality of second driven wheels 25 is four, two of which abuts between the first driven wheel 24 and the second rim 23, and one of the other two abuts against the first driven wheel 24, and the other of the other two abuts against the second rim 23. That is, the first driven wheel 24 is sandwiched between three of the plurality of second driven wheels 25, and the second rim 23 is sandwiched between three of the plurality of second driven wheels 25, which improve the rotation stability of the first driven wheel 24 and the second rim 23.

In at least one embodiment, the first driven wheel 24 may directly abut against the second rim 23 and the first rim 22, the first rim 22 drives the first driven wheel 24 to rotate synchronously, the first driven wheel 24 drives the second rim 23 to rotate synchronously. In at least one embodiment, the second rim 23 may directly abut against the first rim 22, and the first rim 22 drives the second rim 23 to rotate synchronously.

It can be understood that by adjusting a diameter ratio between the first rim 22, the second rim 23, the first driven wheel 24, and the second driven wheel 25, a transmission ratio of the first rim 22 and the second rim 23 can be adjusted. ratio, which in turn facilitates the synchronous adjustment of the focal length of the first moiré lens assembly 30 and the focal length of the second moiré lens assembly 50, so as to improve imaging efficiency.

In at least one embodiment, the first rim 22, the second rim 23, the first driven wheel 24, and the plurality of second driven wheels 25 may be gear structures meshing with each other to improve the accuracy of synchronous rotation.

Figure 4:
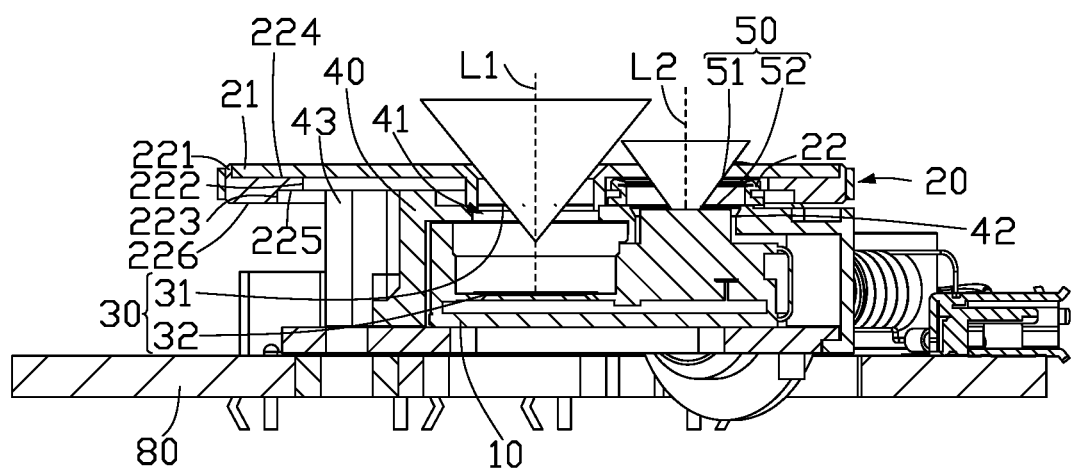
FIG. 4 is a cross-sectional view of an embodiment of the imaging device taken along A-A line of FIG. 1.

Referring to FIG. 2 and FIG. 4, in at least one embodiment, along the direction of the optical axis L1, an inner wall of the first rim 22 may include a bearing wall 221, an abutting wall 222, and a support wall 223 arranged in sequence. The bearing wall 221 is located on a side of the abutting wall 222 away from the light receiving element 12, and the support wall 223 is located on a side of the abutting wall 222 facing the light receiving element 12. The bearing wall 221 abuts against the transparent lens 21 in a radial direction perpendicular to the optical axis L1 to improve the connection stability between the first rim 22 and the transparent lens 21. The abutting wall 222 abuts against the first driven wheel 24 in the radial direction perpendicular to the optical axis L1, so that when the first rim 22 rotates, the abutting wall 222 drives the first driven wheel 24 to rotate synchronously. The support wall 223 abuts against the housing 40 in the radial direction perpendicular to the optical axis L1 improve the stability of the connection between the first rim 22 and the housing 40.

Along the direction of the optical axis L1, the abutting wall 222 protrudes toward the optical axis L1 relative to the bearing wall 221 and the supporting wall 223. A first stepped surface 224 is connected between the bearing wall 221 and the abutting wall 222, and the first stepped surface 224 abuts against the transparent lens 21 in the direction of the optical axis L1 to further improve the connection stability between the first rim 22 and the transparent lens 21. A second stepped surface 225 is connected between the abutting wall 222 and the support wall 223, and the second stepped surface 225 abuts against the housing 40 in the direction of the optical axis L1 to further improve the connection stability between the first rim 22 and the housing 40.

In at least one embodiment, positioning pins extending along the direction of the optical axis L1 are arranged on the first stepped surface 224, and the positioning holes matching the positioning pins are provided on the transparent lens 21 to further improve the connection stability between the first rim 22 and the transparent lens 21.

In at least one embodiment, at least three protrusions 43 spaced around the optical axis L1 are arranged on the housing 40, and each of the at least three protrusions 43 abuts against the support wall 223 and the second stepped surface 225, so that the first rim 22 can sleeve on the housing 40. In at least one embodiment, each of the at least three protrusions 43 may include an arcuate surface, and a contour of the arcuate surface corresponds with a contour of the support wall 223 so as to facilitate the rotation of the first rim 22 relative to the housing 40.

Figure 5:
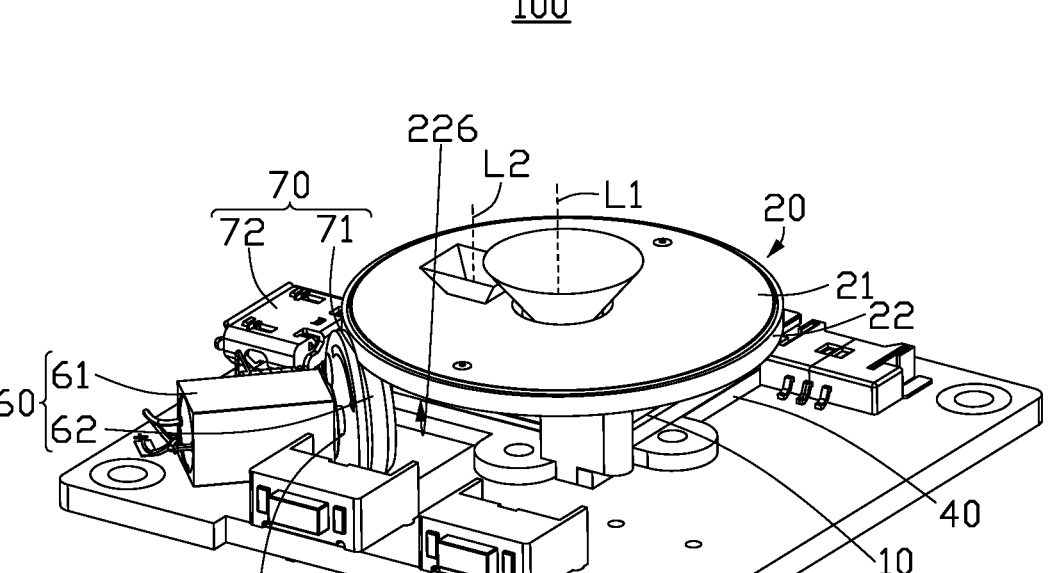
FIG. 5 is a diagram of a second viewing angle of an embodiment of an imaging device according to the present disclosure.

Referring to FIG. 5, in at least one embodiment, the imaging device 100 may further include a driving mechanism 60, and the driving mechanism 60 includes a driving member 61 and a friction wheel 62. The driving member 61 is located on one side of the housing 40 in the radial direction perpendicular to the optical axis L1, so as to reduce a waste of space caused by the driving member 61 in the direction of the optical axis L1. The driving member 61 includes a rotating shaft 611, and the friction wheel 62 is fixedly connected to the rotating shaft 611. The friction wheel 62 also abuts against one side of the first rim 22 in the direction of the optical axis L1 for driving the first rim 22 to rotate. In at least one embodiment, an axial direction of the rotating shaft 611 is perpendicular to the direction of the optical axis L1.

The driving member 61 may be an ultrasonic motor, which is beneficial to improve driving precision and reduce noise interference.

In at least one embodiment, along the direction of the optical axis L1, a side of the first rim 22 facing the friction wheel 62 is provided with an annular friction surface 226, and the friction surface 226 abuts against the friction wheel 62, so as to improve the stability of the friction wheel 62 driving the first rim 22 to rotate. The friction surface 226 may be located at an end of the support wall 223 away from the second stepped surface 225 in the direction of the optical axis L1.

Figure 6:
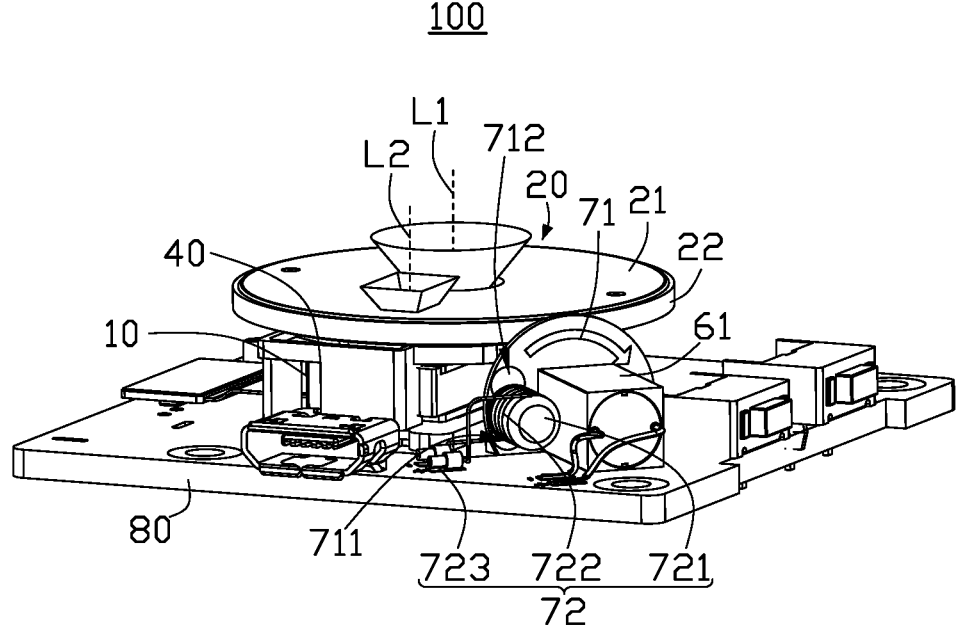
FIG. 6 is a diagram of a third viewing angle of an embodiment of an imaging device according to the present disclosure.

Referring to FIG. 6, in at least one embodiment, the imaging device 100 may further include a deceleration mechanism 70, the deceleration mechanism 70 includes a disc 71 and an electromagnet 72. The disc 71 is fixedly connected to the rotating shaft 611 and rotates synchronously with the friction wheel 62, and the electromagnet 72 is located on one side of the disc 71 and used to generate a magnetic field acting on the disc 71 to generate electromagnetic resistance to the disc 71. Under a continuous effect of electromagnetic resistance, the disc 71 continues to be subjected to resistance opposite to the direction of rotation and gradually changes from a moving state to a stationary state, so that the rotating shaft 611 decelerates synchronously, and finally the rotating shaft 611 and the friction wheel 62 stop rotating. The deceleration mechanism 70 is used to cooperate with the driving member 61 to control a rotation angle of the friction wheel 62, thereby facilitating adjustment of a rotation angle of the first rim 22 and improving the driving precision.

In at least one embodiment, the electromagnet 72 may include a magnetic conduction part 721, a coil part 722, and a power supply part 723. The magnetic conduction part 721 extends along the axial direction of the rotating shaft 611 and is spaced apart from the disc 71. The coil part 722 is sleeved on the magnetic conduction part 721 and electrically connected to the power supply part 723. The power supply part 723 supplies current to the coil part 722, and the magnetic conduction part 721 generates a magnetic field.

When the rotating disc 71 needs to be stopped, the power supply part 723 is controlled to output current to the coil part 722, so that the magnetic conduction part 721 generates a magnetic field acting on the disc 71. A first area 711 is defined as an area where the disc 71 is about to approach the magnetic conduction part 721 along its rotation direction, and a second area 712 is defined as an area where the disc 71 is about to move away from the magnetic conduction part 721 along its rotation direction. According to Faraday's law, the magnetic field generated by the magnetic conduction part 721 will cause the disc 71 o form a plurality of eddy currents (ie, swirl-shaped induced currents) in the first region 711 and the second region 712 respectively. According to Lenz's law, the eddy current formed in the first region 711 will generate a magnetic field opposite to a direction of the magnetic field of the magnetic conduction part 721 to resist the increased magnetic flux due to the magnetic field close to the magnetic conduction part 721, and the eddy current formed in the second region 712 will generate a magnetic field in the same direction as the magnetic field of the magnetic conduction part 721 to compensate for the reduced magnetic flux due to the magnetic field close to the magnetic conduction part 721.

Since the magnetic field of the first region 711 is in the opposite direction to the magnetic field of the magnetic conduction part 721, the electromagnet 72 generates an attractive force on the first region 711 to prevent the first region 711 from further away. Since the magnetic field of the second region 712 is in the same direction as the magnetic field of the magnetic conduction part 721, the electromagnet 72 generates a repulsive force on the second region 712 to prevent the second region 712 from continuing to approach the magnetic field of the magnetic conduction part 721. Attraction and repulsion combine to form electromagnetic resistance. The electromagnet 72 is not in direct contact with the disc 71, which can reduce heat loss and wear of the disc 71.

In at least one embodiment, an increase of electromagnetic resistance can be controlled by increasing the output current of the power supply part 723, by increasing the winding number of the coil part 722, or by increasing the number of control electromagnets 72.

Referring to FIG. 1 and FIG. 2, in at least one embodiment, the imaging device 100 may include a circuit board assembly 80. The housing 40 is fixed on the circuit board assembly 80, and the imaging mechanism 10 is electrically connected to the circuit board assembly 80. The circuit board assembly 80 is used for powering the imaging mechanism 10. In at least one embodiment, the imaging mechanism 10 may be electrically connected to the circuit board assembly 80 through the flexible circuit board 15.

The circuit board assembly 80 may include components such as a power button, a selection button, a buzzer, and a vibration motor, so as to respectively realize the functions of switch, mode selection, and alarm reminder.

Figure 7:
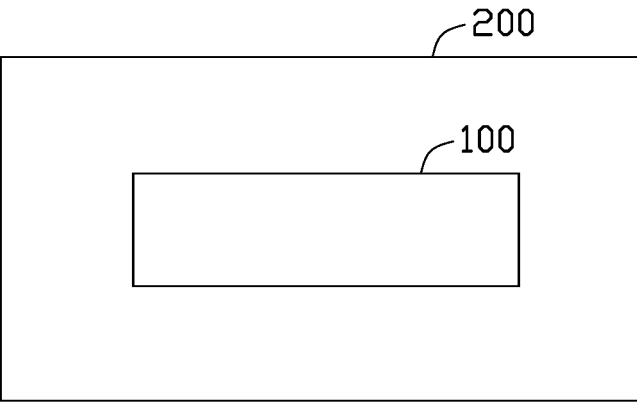
FIG. 7 is a diagram of an embodiment of an electronic device according to the present disclosure.

FIG. 7 illustrates an embodiment of an electronic device 200. The electronic device 200 includes the above imaging device 100. The electronic device 200 may be a hearing aid, a vision aid, a video measuring instrument, a mobile phone, and the like.

In the above imaging device 100 and the above electronic device 200, the irradiating light from the light emitting element 11 passes through the transparent lens 21 to illuminate the target area, the light receiving element 12 receives the natural light and the reflected light of the irradiating light through the through hole 211, and the focal length of the first moiré lens assembly 30 can be adjusted by rotating the transparent lens 21 to drive the first diffractive lens 31 to rotate relative to the second diffractive lens 32. Compared with the existing way of driving the lens to move along the direction of the optical axis to adjust the focal length, a volume occupied by the imaging device 100 in the direction of the optical axis L1 can be reduced, which is beneficial to the miniaturization of the imaging device 100.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An imaging device comprising:

an imaging mechanism comprising a light emitting element, a light receiving element, and a calculation element, wherein the light emitting element and the light receiving element are arranged at intervals, the light emitting element is configured to irradiate a target area with irradiating light, the light receiving element is configured to receive natural light and reflected light of the irradiating light reflected by a target object in the target area, the calculation element is configured to generate image information and distance information of the target object;

a lens assembly having an optical axis extending through the light receiving element, the lens assembly comprising a transparent lens rotatable around the optical axis, wherein a through hole is defined by the transparent lens and a central axis of the through hole coincides with the optical axis of the lens assembly, and wherein along the optical axis of the lens assembly, a projection of the light receiving element is located within a projection range of the through hole, and a projection of the light emitting element is located within a projection range of the transparent lens; and a first moiré lens assembly comprising a first diffractive lens and a second diffractive lens arranged in sequence along a direction of the optical axis of the lens assembly, wherein the first diffractive lens is located in the through hole and fixed on the transparent lens, the second diffractive lens is fixedly connected between the first diffractive lens and the light receiving element, the transparent lens is configured to drive the first diffractive lens to rotate relative to the second diffractive lens to adjust a focal length of the first moiré lens assembly;

wherein the imaging device further comprises a housing, the housing defines a first light through hole and a second light through hole arranged at intervals, the imaging mechanism is received in the housing, the light receiving element is exposed from the first light through hole, and the light emitting element is exposed from the second light through hole, the lens assembly further comprises a first rim, the first rim is rotatably sleeved on the housing around the optical axis of the lens assembly, and the transparent lens is fixed in the first rim, the lens assembly further comprises a second rim, the second rim is located in the first rim and a central axis of the second rim coincides with an optical axis of the light emitting element, the second rim is rotatably connected to the housing around the optical axis of the light emitting element, the imaging device further comprises a second moiré lens assembly, the second moiré lens assembly comprises a third diffractive lens and a fourth diffractive lens sequentially arranged in the direction of the optical axis of the light emitting element, the third diffractive lens is fixed in the second rim, the fourth diffractive lens is located in the second light through hole and fixed in the housing, the second rim is drivingly connected to the first rim, the second rim is used to rotate synchronously with the first rim to adjust a focal length of the second moiré lens assembly.

2. The imaging device of claim 1, wherein the lens assembly further comprises a first driven wheel and a plurality of second driven wheels rotatably connected to the housing, the first driven wheel and the plurality of second driven wheels are located in the first rim, the first driven wheel abuts against the first rim, the plurality of second driven wheels abut against a periphery of the first driven wheel and a periphery of the second rim, at least one of the plurality of second driven wheels abuts against the periphery of the first driven wheel and the periphery of the second rim at the same time.

3. The imaging device of claim 2, wherein the imaging device further comprises a driving mechanism, the driving mechanism comprises a driving member and a friction wheel, the driving member is located on one side of the housing in a radial direction perpendicular to the optical axis of the lens assembly, the driving member comprises a rotating shaft, the friction wheel is fixedly connected to the rotating shaft, the friction wheel abuts against one side of the first rim in the direction of the optical axis of the lens assembly for driving the first rim to rotate.

4. The imaging device of claim 3, wherein the imaging device further comprises a deceleration mechanism, the deceleration mechanism comprises a disc and an electromagnet, the disc is fixedly connected to the rotating shaft and rotates synchronously with the friction wheel, the electromagnet is located on one side of the disc and configured to generate a magnetic field acting on the disc to generate electromagnetic resistance to the disc.

5. The imaging device of claim 4, wherein the electromagnet comprises a magnetic conduction part, a coil part, and a power supply part, the magnetic conduction part extends along an axial direction of the rotating shaft and is spaced apart from the disc, the coil part is sleeved on the magnetic conduction part and electrically connected to the power supply part, the power supply part is configured to supply electrical current to the coil part to cause the magnetic conduction part generating a magnetic field.

6. The imaging device of claim 3, wherein along the direction of the optical axis of the lens assembly, a side of the first rim facing the friction wheel is provided with an annular friction surface, and the friction surface abuts against the friction wheel.

7. The imaging device of claim 3, wherein along the direction of the optical axis of the lens assembly, an inner wall of the first rim comprises a bearing wall, an abutting wall, and a support wall arranged in sequence, the bearing wall abuts against the transparent lens in a radial direction perpendicular to the optical axis of the lens assembly, the abutting wall abuts against the first driven wheel in the radial direction perpendicular to the optical axis of the lens assembly, the support wall abuts against the housing in the radial direction perpendicular to the optical axis of the lens assembly, a first stepped surface is connected between the bearing wall and the abutting wall, the first stepped surface abuts against the transparent lens in the direction of the optical axis of the lens assembly, a second stepped surface is connected between the abutting wall and the support wall, and the second stepped surface abuts against the housing in the direction of the optical axis of the lens assembly.

8. The imaging device of claim 1, wherein the imaging device further comprises a circuit board assembly, the housing is fixed on the circuit board assembly, and the imaging mechanism is electrically connected to the circuit board assembly.

9. An electronic device comprising:
an imaging device comprising:
an imaging mechanism comprising a light emitting element, a light receiving element, and a calculation element, wherein the light emitting element and the light receiving element are arranged at intervals, the light emitting element is configured to irradiate a target area with irradiating light, the light receiving element is configured to receive natural light and reflected light of the irradiating light reflected by a target object in the target area, the calculation element is configured to generate image information and distance information of the target object;
a lens assembly having an axis extending through the light receiving element and the lens assembly comprising a transparent lens rotatable around the axis, wherein a through hole is defined by the transparent lens and a central axis of the through hole coincides with the optical axis of the lens assembly, along the optical axis of the lens assembly, a projection of the light receiving element is located within a projection range of the through hole, and a projection of the light emitting element is located within a projection range of the transparent lens; and
a first moiré lens assembly comprising a first diffractive lens and a second diffractive lens arranged in sequence along a direction of the optical axis of the lens assembly, wherein the first diffractive lens is located in the through hole and fixed on the transparent lens, the second diffractive lens is fixedly connected between the first diffractive lens and the light receiving element, the transparent lens is configured to drive the first diffractive lens to rotate relative to the second diffractive lens to adjust a focal length of the first moiré lens assembly;
wherein the imaging device further comprises a housing, the housing defines a first light through hole and a second light through hole arranged at intervals, the imaging mechanism is received in the housing, the light receiving element is exposed from the first light through hole, and the light emitting element is exposed from the second light through hole, the lens assembly further comprises a first rim, the first rim is rotatably sleeved on the housing around the optical axis of the lens assembly, and the transparent lens is fixed in the first rim, the lens assembly further comprises a second rim, the second rim is located in the first rim and a central axis of the second rim coincides with an optical axis of the light emitting element, the second rim is rotatably connected to the housing around the optical axis of the light emitting element, the imaging device further comprises a second moiré lens assembly, the second moiré lens assembly comprises a third diffractive lens and a fourth diffractive lens sequentially arranged in the direction of the optical axis of the light emitting element, the third diffractive lens is fixed in the second rim, the fourth diffractive lens is located in the second light through hole and fixed in the housing, the second rim is drivingly connected to the first rim, the second rim is used to rotate synchronously with the first rim to adjust a focal length of the second moiré lens assembly.

10. The electronic device of claim 9, wherein the lens assembly further comprises a first driven wheel and a plurality of second driven wheels rotatably connected to the housing, the first driven wheel and the plurality of second driven wheels are located in the first rim, the first driven wheel abuts against the first rim, the plurality of second driven wheels abut against a periphery of the first driven wheel and a periphery of the second rim, at least one of the plurality of second driven wheels abuts against the periphery of the first driven wheel and the periphery of the second rim at the same time.

11. The electronic device of claim 10, wherein the imaging device further comprises a driving mechanism, the driving mechanism comprises a driving member and a friction wheel, the driving member is located on one side of the housing in a radial direction perpendicular to the optical axis of the lens assembly, the driving member comprises a rotating shaft, the friction wheel is fixedly connected to the rotating shaft, the friction wheel abuts against one side of the first rim in the direction of the optical axis of the lens assembly for driving the first rim to rotate.

12. The electronic device of claim 11, wherein the imaging device further comprises a deceleration mechanism, the deceleration mechanism comprises a disc and an electromagnet, the disc is fixedly connected to the rotating shaft and rotates synchronously with the friction wheel, the electromagnet is located on one side of the disc and configured to generate a magnetic field acting on the disc to generate electromagnetic resistance to the disc.

13. The electronic device of claim 12, wherein the electromagnet comprises a magnetic conduction part, a coil part, and a power supply part, the magnetic conduction part extends along an axial direction of the rotating shaft and is spaced apart from the disc, the coil part is sleeved on the magnetic conduction part and electrically connected to the power supply part, the power supply part is configured to supply current to the coil part to cause the magnetic conduction part generating a magnetic field.

14. The electronic device of claim 11, wherein along the direction of the optical axis of the lens assembly, a side of the first rim facing the friction wheel is provided with an annular friction surface, and the friction surface abuts against the friction wheel.

15. The electronic device of claim 11, wherein along the direction of the optical axis of the lens assembly, an inner wall of the first rim comprises a bearing wall, an abutting wall, and a support wall arranged in sequence, the bearing wall abuts against the transparent lens in a radial direction perpendicular to the optical axis of the lens assembly, the abutting wall abuts against the first driven wheel in the radial direction perpendicular to the optical axis of the lens assembly, the support wall abuts against the housing in the radial direction perpendicular to the optical axis of the lens assembly, a first stepped surface is connected between the bearing wall and the abutting wall, the first stepped surface abuts against the transparent lens in the direction of the optical axis of the lens assembly, a second stepped surface is connected between the abutting wall and the support wall, and the second stepped surface abuts against the housing in the direction of the optical axis of the lens assembly.

16. The electronic device of claim 9, wherein the imaging device further comprises a circuit board assembly, the housing is fixed on the circuit board assembly, and the imaging mechanism is electrically connected to the circuit board assembly.

* * * * *